(12) United States Patent
Proulx et al.

(10) Patent No.: US 8,000,264 B2
(45) Date of Patent: Aug. 16, 2011

(54) CONFIGURATION MANAGEMENT OF IP/MPLS ROUTER RINGS

(75) Inventors: Denis Armand Proulx, Kanata (CA); Patricia Michaud, Kanata (CA)

(73) Assignee: Alcatel Lucent, Paris (FR)

( * ) Notice: Subject to any disclaimer, the term of this patent is extended or adjusted under 35 U.S.C. 154(b) by 183 days.

(21) Appl. No.: 12/432,524

(22) Filed: Apr. 29, 2009

(65) Prior Publication Data

US 2010/0278078 A1 Nov. 4, 2010

(51) Int. Cl.
*H04L 12/28* (2006.01)
*G06F 15/177* (2006.01)
*G06F 7/04* (2006.01)

(52) U.S. Cl. .......... 370/254; 370/401; 709/220; 726/26
(58) Field of Classification Search .......... 370/254, 370/255, 258, 395.5, 395.51; 709/220–222; 726/26
See application file for complete search history.

(56) References Cited

U.S. PATENT DOCUMENTS

| 6,856,602 | B1 * | 2/2005 | Westberg | 370/254 |
| 7,398,323 | B1 * | 7/2008 | Gerraty et al. | 709/242 |
| 7,603,445 | B1 * | 10/2009 | Fehrle | 709/220 |
| 7,640,317 | B2 * | 12/2009 | Jain et al. | 709/213 |
| 2004/0143755 | A1 * | 7/2004 | Whitaker et al. | 713/200 |
| 2005/0201299 | A1 * | 9/2005 | Radi et al. | 370/254 |
| 2009/0217382 | A1 * | 8/2009 | Lecheler | 726/26 |

* cited by examiner

*Primary Examiner* — Kwang B Yao
*Assistant Examiner* — Candal Elpenord
(74) *Attorney, Agent, or Firm* — Kramer & Amado P.C.

(57) ABSTRACT

The invention is directed to managing changes to a configuration of routers connected in a ring network architecture. Embodiments of the invention alleviate risks to services carried over a ring of IP/MPLS routers when configuration changes are made to the ring, such as inserting a router into, or removing a router from, the ring. To that end, embodiments of the invention automate some steps of such a configuration change operation that were previously performed manually, and coordinate those steps with other steps of the operation using a procedure stored as instructions on a computer readable media and executed by a computer system in order to effect and validate a correct sequencing of the steps.

20 Claims, 2 Drawing Sheets

CONFIGURATION MANAGEMENT OF IP/MPLS ROUTER RINGS

FIELD OF THE INVENTION

The invention is directed to packet switching communication networks, particularly to managing the configuration of routers in a ring network architecture.

BACKGROUND OF THE INVENTION

Internet Protocol (IP)/Multi Protocol Label Switching (MPLS) routers that are communicatively connected in a ring network architecture, hereinafter also referred to as router rings, are commonly deployed in local access networks such as in Enterprise networks. Communication traffic between the router rings is provided by a Service Provider core IP/MPLS network. Typically, the core network would support thousands of such rings. Often, due to changes in networking requirements provided by such a router ring, a router must be added or removed from the ring while the ring is in operation, i.e. while the ring is carrying data packet traffic. These operations are a combination of steps performed in the field e.g. cutting fiber cables and physically inserting the router, and provisioning changes entered manually at a Network Management System (NMS) located in a central office. Typically, there can be approximately 400 commands entered into the NMS to effect insertion of a router into a router ring. Due to the potential for error that arises from the complexity of such an operation, there is a risk to services carried on a router ring when a router is being added to, or removed from, the ring. Since any risk of service disruption is unwanted, it is desirable to reduce such risks when making changes to the configuration of router rings, such as when inserting a router into, or removing a router from, a router ring.

SUMMARY

The invention is directed to managing changes to a configuration of routers connected in a ring network architecture.

Compared to prior art approaches, embodiments of the invention alleviate risks to services carried over a ring of IP/MPLS routers when configuration changes are made to the ring, such as inserting a router into, or removing a router from, the ring. To that end, embodiments of the invention automate some steps of such a configuration change operation that were previously performed manually, and coordinate those steps with other steps of the operation using a procedure stored as instructions on a computer readable media and executed by a computer system in order to effect and validate a correct sequencing of the steps.

Some embodiments of the invention provide a service platform, or other similar computer system, for executing instructions stored on computer readable media. The instructions, when executed, cause commands to be sent to a NMS managing the router ring, thereby causing steps previously performed manually to effect a ring configuration change to be performed automatically, hence with less potential for error such as operator keystroke error. Furthermore, the instructions coordinate the automatically performed steps with those performed manually in the field to indicate or otherwise ensure a correct sequencing of steps performed, as well as validating the manually performed steps before bringing the configuration changes into service.

In addition to reducing risk of disruption to services due to ring configuration changes, embodiments of the invention reduce the time and effort required to make such changes.

Furthermore, by virtue of providing a separate service platform that can be communicatively coupled to an NMS managing a router ring, embodiments of the invention can be deployed in existing networks, whereby compatibility with various network management systems from a variety of vendors can be achieved via use of common commands or a command interpreter function in the service platform. Further, in cases where the separate service platform is implemented by a laptop computer or other type of portable computing system, the service platform can be used in the field by a person making configuration changes there to a router ring, thereby enabling the configuration change operation to be performed faster, more easily, and with less risk of disrupting services provided by the router ring during the configuration change operation.

According to an aspect of the invention there is provided a method of managing configuration changes to a configuration of routers connected in a ring network architecture. The configuration changes include provisioning changes to information provisioned on at least one of the routers and connectivity changes to connections between at least two of the routers. The method comprises automatically executing instructions stored on a computer readable media, which when executed cause a sequence of steps to be performed. The sequence includes locking the routers to prevent any alteration to information provisioned thereon that is not related to the configuration changes; determining ports to be affected by the connectivity changes; taking the ports out of service; indicating that the connectivity changes should be initiated; determining the connectivity changes are complete; bringing the ports into service; and then unlocking the routers.

According to another aspect of the invention there is provided a service platform for managing configuration changes to a configuration of routers connected in a ring network architecture. The configuration changes include connectivity changes to connections between at least two of the routers. The service platform includes a service application comprising instructions stored on computer readable media which when executed by the service platform provide means to effect a sequence of actions when the service platform is communicatively coupled to a network management entity of the ring network architecture. The sequence of actions comprises locking the routers to prevent any alteration to information provisioned thereon that is not related to the configuration changes; determining ports to be affected by the connectivity changes; taking the ports out of service; indicating that the connectivity changes should be initiated; determining the connectivity changes are complete; bringing the ports into service; and unlocking the routers.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
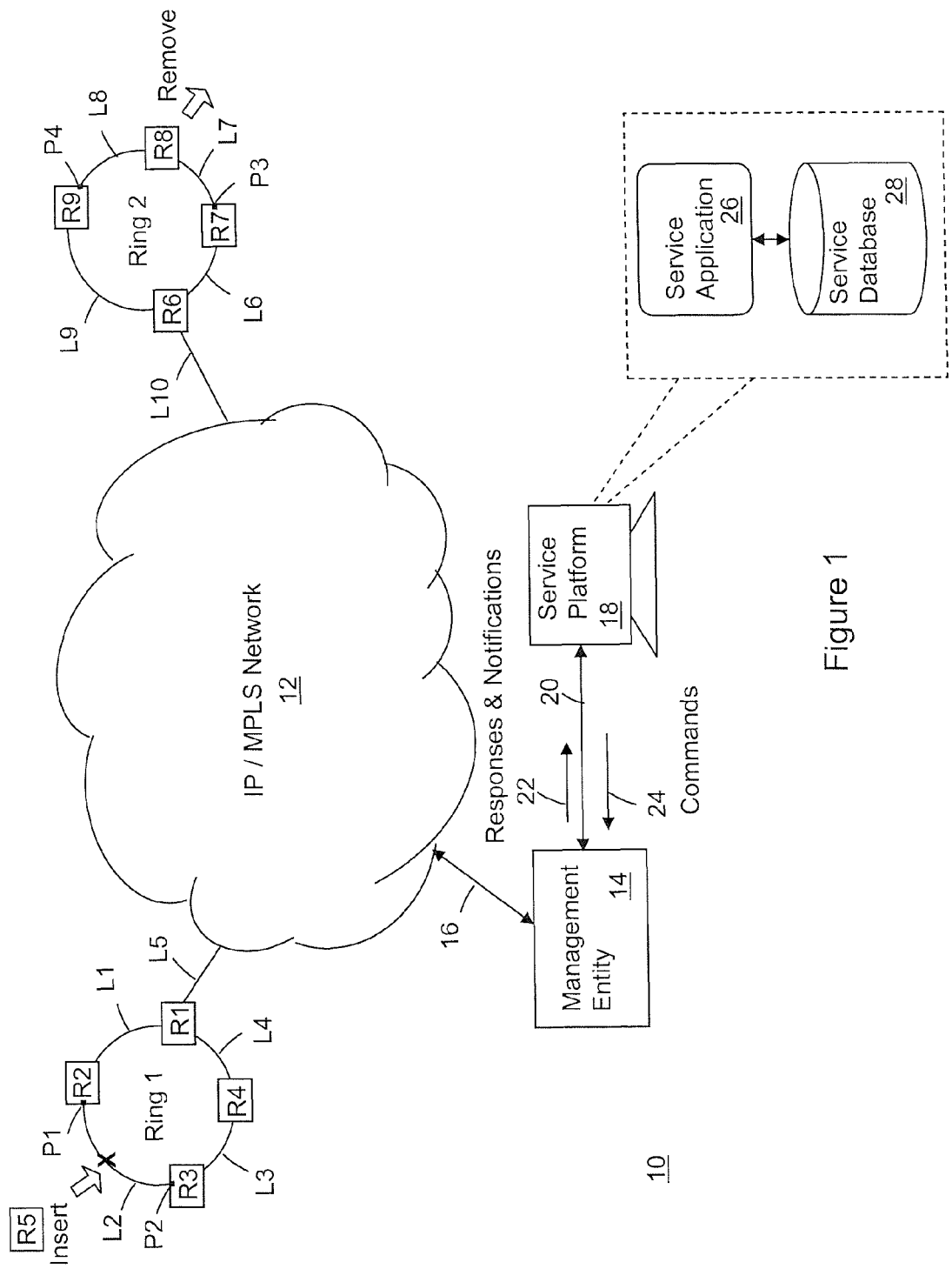
FIG. 1 illustrates a network configuration including a service platform, that is in accordance with a first embodiment of the invention, for managing changes to a configuration of IP/MPLS routers connected in a ring network architecture.

Referring to FIG. 1, a network configuration 10 includes an IP/MPLS network, which for example could be a core network of a Service Provider. The IP/MPLS network 10 is communicatively connected to a first ring of routers Ring1 and to a second ring of routers Ring2 such data packet traffic can be communicated between the first and second router rings Ring1, Ring2 via the IP/MPLS network 10. The first router ring Ring1 includes a group of four routers connected in a ring network architecture by a respective bidirectional link between adjacent routers. That is, a first router R1 and a second router R2 are connected by a first bidirectional link L1. Similarly, the second router R2 and a third router R3 are connected by a second bidirectional link L2; the third router R3 and a fourth router R4 are connected by a third bidirectional link L3, and the fourth and first routers R4, R1 are connected by a fourth bidirectional link L4. The four bidirectional links L1 to L4 would each typically comprise two unidirectional links so that data packet traffic can be routed around the first router ring Ring1 in both directions, e.g. clockwise and counterclockwise, as is typical with ring network architectures. Furthermore, in the event that one of the four routers R1 to R4 or four links L1 to L4 becomes inoperative, the bidirectional property of the first router ring Ring1 can be used to route data packet traffic around the inoperative router or link. The first router ring Ring1 is communicatively connected to the IP/MPLS network by a fifth link L5, which is also a bidirectional link. A typical implementation of the links L1 to L5 is fiber optic cables, although electrical cables and even wireless channels could be used.

Similar to the first router ring Ring1, the second router ring Ring2 also includes a group of four routers connected in a ring network architecture by a respective bidirectional link between adjacent routers. That is, a sixth router R6 and a seventh router R7 are connected by a sixth bidirectional link L6. Similarly, the seventh router R7 and an eighth router R8 are connected by a seventh bidirectional link L7; the eighth router R8 and a ninth router R9 are connected by an eighth bidirectional link L8, and the ninth and sixth routers R9, R6 are connected by a ninth bidirectional link L9. The bidirectional links L6 to L9 of the second router ring Ring2 would each typically comprise two unidirectional links so that data packet traffic can be routed around the second router ring Ring2 in both directions. Furthermore, in the event that one of the routers R6 to R9 or links L6 to L9 of the second router ring Ring2 becomes inoperative, the bidirectional property of the second router ring Ring2 can be used to route data packet traffic around the inoperative router or link. The second router ring Ring2 is communicatively connected to the IP/MPLS network by a tenth link L10, which is also a bidirectional link. A typical implementation of the links L6 to L10 of the second router Ring2 is fiber optic cables, although electrical cables and even wireless channels could be used. It is not a requirement that all links of a given router ring Ring1, Ring2 or connecting one of the router rings Ring1, Ring2 to the IP/MPLS network 10 by of the same type, e.g. optical fiber cable, electrical cable, and wireless channel.

Although not shown in FIG. 1 for simplicity sake, typically there would be thousands of router rings similar to the first and second router rings Ring1, Ring2 communicatively connected to the IP/MPLS network 12. MPLS label switched paths (LSPs) or pseudowire connections, for example, would be provisioned to provide communicative connectivity between certain router rings, so that data packet traffic can be communicated between those router rings as required. Furthermore, for additional protection against failures, additional links communicatively connecting a router ring to the IP/MPLS network 12 could be provided. For example, the first router ring Ring1 could be connected to the IP/MPLS network 12 via a bidirectional link between the fourth router R4 and the IP/MPLS network 12.

FIG. 1 depicts two configuration change scenarios. A first scenario involves insertion of a fifth router R5 into the first router ring Ring1 at a location X in the second link L2. This configuration change will affect the second link L2 and two ports to which it is attached; a first port P1 at the second router R2 and a second port P2 at the third router R3. Specifically, the insertion of the fifth router R5 will involve cutting the second link L2 at the location X and inserting the fifth router R5 there. A second scenario involves removal of the eighth router R8 from the second router ring Ring2. This configuration change will affect the seventh and eighth links L7, L8 and a third port P3 at the seventh router R7 to which the seventh link L7 is attached and a fourth port P4 at the ninth router R9 to which the eight link L8 is attached. Specifically, removal of the eighth router R8 will involve splicing or otherwise connecting the seventh and eighth links L7, L8 to each other at ends that were previously connected to the eighth router R8 after that router is removed from the second router ring Ring2. The steps performed to accomplish both of these configuration change scenarios are described later in more detail with respect to an embodiment of a method of managing changes to a configuration of IP/MPLS routers connected in a ring network architecture.

Still referring to FIG. 1, the network configuration 10 includes a management entity 14 that is communicatively coupled to the IP/MPLS network 12 via a connection 16. The management entity 14 would typically be a network management system capable of performing operation, administration and maintenance (OAM) type functions on network elements in the IP/MPLS network 12 and the routers R1 to R9. This functionality of the management entity 14 includes the capability to receive reports of equipment, service, and provisioning related events from network elements of the MPLS network 12, including event reports from the routers regarding operational status of their respective ports, e.g. P1 to P4, and links, e.g. L1 to L10, connected to the routers, among other things. The management entity 14 would typically use simple network management protocol (SNMP) messages communicated over the connection 16 to carry out the OAM functions.

The network configuration 10 also includes a service platform 18 that is communicatively coupled to the management entity 14 via an open operating system (OS) interface 20. Using the open OS interface 20, the service platform 18 has access to event notifications 22, which include event notifications related to the event reports from the network elements. Further using the open OS interface 20 the service platform 18 can issue commands 24 to the management entity 14 including commands to effect provisioning changes at the routers and operational status of router ports, e.g. P1 to P4, and links, e.g. L1 to L10, connected to the routers, e.g. R1 to R9. In a preferred embodiment, these commands 24 are in the form of extensible markup language (XML) messages and the open OS interface 20 is an XML interface; although other types of messages and interfaces could be used. The network management entity receives the XML messages, interprets their meaning, and in response communicates with the routers R1 to R9 using SNMP messages to make the desired provisioning and operational status changes indicated by the XML messages. Messaging from the management entity 14 to the service platform 18, including information in event notifications 22, is also in the form of XML messages in the preferred embodiment. The service platform 18 would typically be a laptop or desktop computer or workstation.

The service platform 18 executes a service application 26 that is in communication with a service database 28 on the service platform 18, although the service database 28 could also reside on the management entity 14 with access to it given by the open OS interface 20. The service application 26 is a software program that embodies a method of managing changes to a configuration of IP/MPLS routers connected in a ring network architecture in accordance with an embodiment of the invention. The service application 26 accesses the service database 28 to retrieve costumer-specific information and information pertinent to a router ring when generating a configuration file for a router to be inserted into a router ring. The service database 28 may also include vendor-specific information pertaining to various network management systems, in particular to vendor-specific commands to be used with such systems. The service application 26 accesses such information from the service database 28 to provide a command interpreter function that enables the service platform to be compatible with various network management systems from different vendors. Additionally, this command interpreter function, aided by other translation related information in the service database 28, can be extended to provide communication capabilities to other types of OS interfaces.

Figure 2:
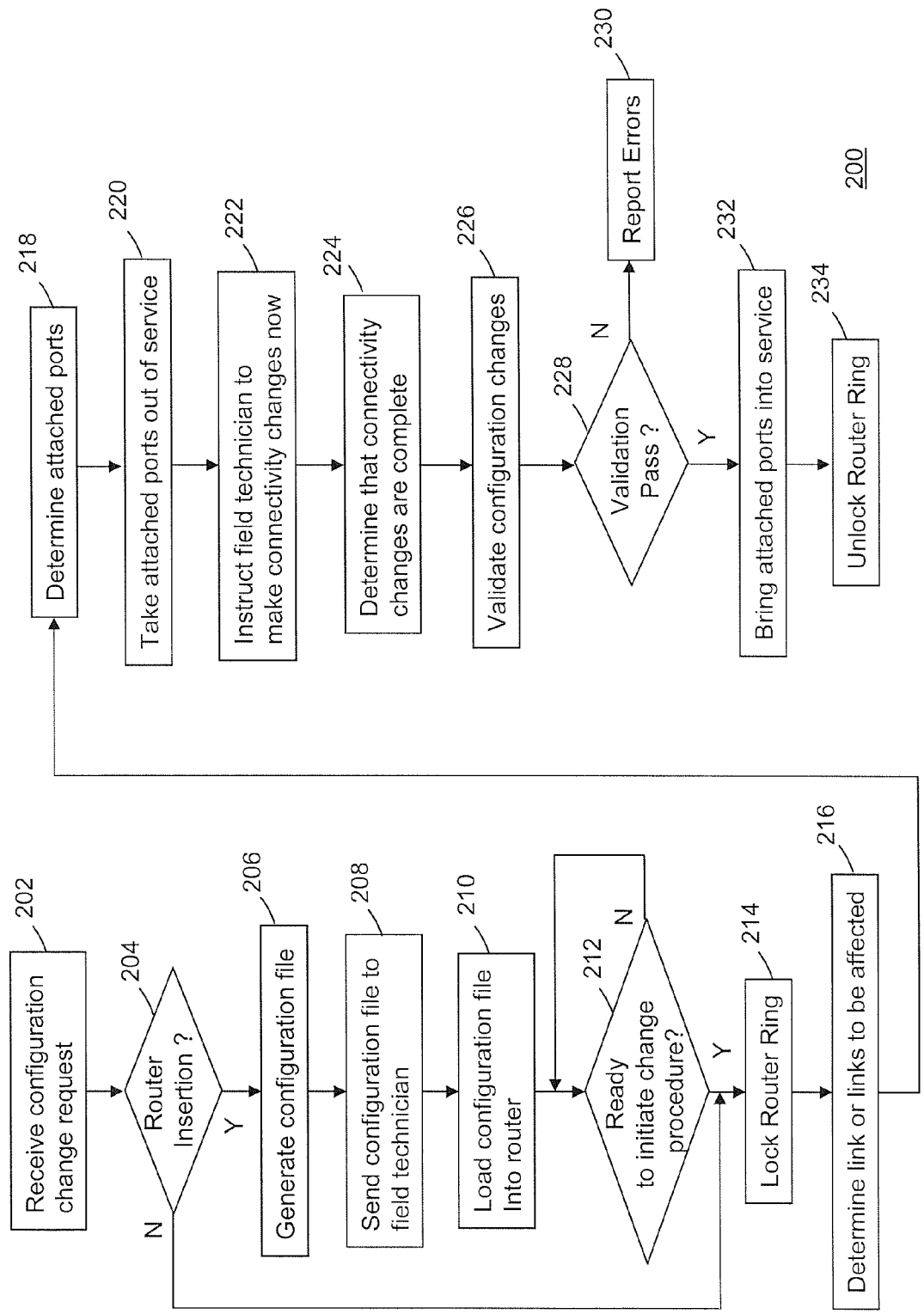
FIG. 2 illustrates a method, that is in accordance with a second embodiment of the invention, of managing changes to a configuration of IP/MPLS routers connected in a ring network architecture.

Referring to FIG. 2, a method 200 of managing configuration changes to a configuration of IP/MPLS routers connected in a ring network architecture will now be described with additional reference to FIG. 1. The configuration changes include provisioning changes to information provisioned on one or more of the routers and connectivity changes to one or more connections between the routers, such as provided by links L1 to L10 shown in FIG. 1. The method 200 includes receiving 202 a configuration change request. The request includes identification of the router ring to be affected by the change, and, in the case where that router is to be removed from the ring, identification of the router to be removed, or, in the case where a router is to be inserted into the router ring, identification of two adjacent routers between which the router is to be inserted. The configuration change request would preferably be received by the service application 26, but it could also be received by the management entity 14, in which case the aforementioned router ring and router identification would be forwarded to the service application 26 via the open OS interface 20.

A determination 204 is then made whether the requested configuration change involves inserting a router into the router ring. In the affirmative case, a configuration file is generated 206 for the router to be inserted. The configuration file is generated by the service application 26 using information from the service database 28, such as customer specific information pertinent to the router ring, and optionally or additionally, other information retrieved from the management entity 14 via the open OS interface 20. The configuration file is sent 208 to a field technician or otherwise made available for loading 210 into the router to be inserted. Optionally or additionally to sending the configuration file to the field technician, the service application 26 could simply provide an indication, such as a notification displayed by the service platform 18, that the configuration file is ready. Other types of notification such as an e-mail, an instant message sent to the field technician or an operator of the management entity 14 could also be used.

A determination 212 is then made whether the router to be inserted is configured and ready to be inserted. That is, a determination is made whether the change procedure can be initiated. This determination would typically be made based on a reply from the field technician to a question of that effect made, and the answer received, via the management entity 14 or preferably the service application 26. In the affirmative case, the router ring is locked 214 so as to prevent any provisioning or other configuration changes that are not related to the present configuration change.

A determination 216 of the link to be affected, in the case of a router insertion, or links to be affected, in the case of a router removal, is then made. Preferably this determination is made based on router identification information included in the received configuration change request. An advantage of making this determination rather than accepting it as input from an operator or field technician is that doing so reduces the risk of data entry errors as well as providing information from another source that can be used later when validating the configuration changes. For further clarity, any link to be affected is one that will undergo a physical connectivity change as a result of the connectivity changes that included in the configuration changes.

A determination 218 of the ports attached to the link, or links, to be affected is then made. Similar to the determination of the link or links to be affected, the present determination of the ports attached to the subject link or links is also made based on router identification information included in the received configuration change request, and has a similar advantage of being useful in later validation of configuration changes.

The attached ports determined in the previous step are then taken out of service 220. As a result of taking these ports out of service, traffic protection functionality present on the routers and supported by the network architecture of the router ring reroutes data packet traffic around these out-of-service ports, thereby avoiding any disruption to services carried by the traffic.

It should be appreciated that it is not necessary to first determine the links or links to be affected in order to determine which ports to take out of service. For example, the latter could be determined from information in the configuration change request, or simply specified to the service application 26 by the field technician. In those cases some embodiments may omit the step of determining 218 the link or links to be affected.

The field technician is instructed 222 to make connectivity changes in the field to the router ring configuration. In the case of a router insertion, these connectivity changes include cutting the link to be affected at the location where the router is to be inserted and connecting each cut end of the link to a respective port of that router. In the case where a router is to be removed, these connectivity changes include removing that router by disconnecting the links to be affected from their respective attached ports of that router and connecting the resulting disconnected ends of those links to each other.

Regarding the foregoing connectivity changes it should be noted in both cases that the aforementioned links are bidirectional, hence each comprises two unidirectional links, and that care should be taken when cutting or splicing links to preserve the directionality of the affected unidirectional links. Likewise, the aforementioned ports are bidirectional, each comprising a transmit and a receive port, and that care should be taken to abide by the directionality of the unidirectional links when connecting these links to the transmit and receive ports.

Further regarding the connectivity changes, the field technician is instructed 222 to make the changes by a notification generated by the service application 26 and displayed at the service platform 18 or management entity 14. In the case of the former the service platform 18 could be co-located with the field technician, e.g. the service platform 18 could be a laptop computer or other portable computer system at the disposal of the field technician, and in the case of the latter the notification could be relayed by an operator of the management entity 14, e.g. via a cell phone call. Generally, an indication when the connectivity changes can be initiated is provided. Other ways of communicating the notification to and receiving responses from the field technician are possible such as via e-mail or instant messaging and may be used in embodiments of the invention.

The service application 26 makes a determination 224 that the connectivity changes are complete. Preferably this determination includes receiving a notification from the field technician when the connectivity changes are complete. However, the service application 26 could also continuously monitor connectivity of the router ring to make this determination and optionally or additionally query the field technician or operator of the management entity 14 for confirmation to that effect. Again, as mentioned with the step of instructing 222 the technician to make the connectivity changes, receiving a notification that these changes have been made can be realized in many ways. Preferably, the service platform 18 would be a laptop computer co-located with the field technician and the notification of the changes being complete would be realized by the technician providing information to that effect to the service application 26.

Any provisioning changes that are included in the configuration changes can be made before or after the connectivity changes are complete, or even while the connectivity changes are being made. The service application 26 will not attempt to validate the configuration changes until both the provisioning changes and connectivity changes have been completed.

The configuration changes are validated 226 by the service application 26 to confirm an absence of errors before bringing the attached ports into service. For example, to validate the configuration changes the service application 26 compares links and ports actually affected by the configuration changes to links and ports that were previously determined 216, 218 to be affected by the configuration changes. In the case where this comparison indicates a mismatch, it is possible that a router was inserted into the router ring in a wrong location, or a router removal was performed on the wrong router. Additionally, in cases the where the configuration file was generated 206 by the service application 26, the configuration changes, e.g. those on an inserted router, can be compared to information in the generated configuration file. In the case where this comparison indicates a mismatch, it is possible that a wrong router was inserted, or the inserted router was not loaded with the generated configuration file, among other possible error scenarios.

As an outcome of various comparison and tests involved in validating 226 the configuration changes, a determination 228 is made whether any configuration errors are present. In the affirmative case these errors are preferably reported 230 by the service application 26, however the service application may simply report a validation failure, i.e. a failure to confirm an absence of errors. As with the instruction and determination steps 222, 224, reporting 230 errors can be accomplished in numerous ways involving the service platform 18 and management entity 14, of these, it is preferable have the service application 26 do the reporting via the service platform 18.

If there are no configuration errors to report 230, the service application 26 causes the attached ports to be brought into service, otherwise the method terminates. Alternatively to the latter, the method could return to the step of instructing 222 the technician to make connectivity changes. In the previously described router insertion example the attached ports are the first and second ports P1, P2, and in the router removal example these attached ports are the third and fourth ports P3, P4. The service application 26 causes the attached ports to be brought into service by sending commands 24 to the management entity 14 over the OS interface 20. Any additional actions taken on resources or entities such as software processes that need to be started, initialized, rebooted or otherwise affected to cause the configuration changes made to the router ring to be put into an operational state are likewise initiated by the service application 26. The method then ends by unlocking 234 the router ring to provisioning changes or other changes not related to the present configuration changes, thereby removing the condition instantiated when the router ring was previously locked 214.

Numerous modifications, variations and adaptations may be made to the embodiments of the invention described above without departing from the scope of the invention, which is defined in the claims. For example, regarding the described method embodiment, the intervening steps between receiving a configuration change request and determining that the change procedure is ready to be initiated could be omitted in embodiments where providing a router to be inserted with a configuration file is accomplished in another way. Furthermore, the steps of determining the link or links to be affected and determining their attached ports could be omitted in embodiments where this information is included in the configuration change request. These modifications to the described method embodiment would also result in consequent changes to the validation step, such as using the identification of links and ports to be affected obtained from the configuration change request rather than determining this information from another source.

What is claimed is:

1. A method of managing configuration changes to a configuration of routers connected in a ring network architecture, the configuration changes including provisioning changes to information provisioned on at least one of the routers and connectivity changes to connections between at least two of the routers, the method comprising:
   executing automatically, instructions stored on a non-transitory computer-readable medium, the instructions when executed causing a sequence of steps to be performed, the sequence comprising:
   determining that the configuration changes include inserting a router;
   generating a configuration file for the router to be inserted;
   indicating the configuration file is ready to be loaded into the router to be inserted;
   determining the router to be inserted is ready for insertion into the ring network architecture;
   locking the routers to prevent any alteration to information provisioned thereon that is not related to the configuration changes;
   determining ports to be affected by the connectivity changes;
   taking the ports out of service;
   indicating that the connectivity changes should be initiated;
   determining the connectivity changes are complete;
   bringing the ports into service; and
   unlocking the routers.

2. The method of claim 1, wherein the sequence further comprises:

subsequent to determining the connectivity changes are complete, validating the configuration changes to confirm an absence of errors prior to bringing the ports into service.

3. The method of claim 1, wherein the sequence further comprises:
prior to the step of locking, receiving a configuration change request related to the configuration changes, wherein the step of determining ports further comprises using information in the configuration change request.

4. The method of claim 3, wherein the step of validating further comprises:
using information in the configuration change request.

5. The method of claim 1, wherein the step of validating further comprises:
using information in the configuration file.

6. The method of claim 1, wherein the step of validating further comprises:
responsive to a failure to confirm an absence of errors, reporting the failure; and
terminating execution of the sequence.

7. The method of claim 3, wherein the step of determining ports further comprises:
determining any links to be affected by the connectivity changes.

8. The method of claim 7, wherein the step of determining any links further comprises:
using information in the configuration change request.

9. The method of claim 1, wherein the routers comprise IP/MPLS routers.

10. A service platform for managing configuration changes to a configuration of routers connected in a ring network architecture, the configuration changes including connectivity changes to connections between at least two of the routers, the service platform comprising:
a service application comprising instructions stored on a non-transitory computer-readable medium that, when executed by the service platform, provide means to effect a sequence of actions when the service platform is communicatively coupled to a network management entity of the ring network architecture, the sequence comprising:
determining that the configuration changes include inserting a router;
generating a configuration file for the router to be inserted;
indicating the configuration file is ready to be loaded into the router to be inserted;
determining the router to be inserted is ready for insertion into the ring network architecture;
locking the routers to prevent any alteration to information provisioned thereon that is not related to the configuration changes;
determining ports to be affected by the connectivity changes;
taking the ports out of service;
indicating that the connectivity changes should be initiated;
determining the connectivity changes are complete;
bringing the ports into service; and
unlocking the routers.

11. The service platform of claim 10, wherein the sequence further comprises:
subsequent to determining the connectivity changes are complete, validating the configuration changes to confirm an absence of errors prior to bringing the ports into service.

12. The service platform of claim 10, wherein the sequence further comprises:
prior to locking, receiving a configuration change request related to the configuration changes, wherein the step of determining ports further comprises using information in the configuration change request.

13. The service platform of claim 12, wherein the step of validating further comprises:
using information in the configuration change request.

14. The service platform of claim 10, wherein the step of validating further comprises:
using information in the configuration file.

15. The service platform of claim 10, wherein the step of validating further comprises:
responsive to a failure to confirm an absence of errors, reporting the failure; and
terminating execution of the sequence of operations.

16. The service platform of claim 12, wherein the step of determining ports further comprises:
determining any links to be affected by the connectivity changes.

17. The service platform of claim 16, wherein the step of determining any links further comprises:
using information in the configuration change request.

18. The service platform of claim 10, wherein the instructions comprise command instructions for communicating with the network management entity over an operating system (OS) interface.

19. The service platform of claim 18, further comprising:
a database for translating the command instructions from a first format to a second format.

20. The service platform of claim 10, wherein the routers comprise IP/MPLS routers.

* * * * *